2,789,911
Patented Apr. 23, 1957

2,789,911

ICING COMPOSITIONS COMPRISING CARBOXYMETHYL DEXTRAN AND METHOD OF PRODUCING THE SAME

Harry A. Toulmin, Jr., Dayton, Ohio, assignor, by mesne assignments, to Midland Chemical Corporation, Dayton, Ohio, a corporation of Delaware No Drawing. Application June 7, 1954,
Serial No. 435,088

14 Claims. (Cl. 99—139)

This invention relates to improvements in icings for use on bakery products.

Various types of icings are known the basic ingredients of which are sugar and water but which may comprise supplementary ingredients such as fats and shortening, egg whites, skim milk powder, chocolate and flavoring ingredients as well as, in some cases, flour or cornstarch as a bodying agent. Some icings consist essentially of egg whites and sugars.

It is the common practice to include in the icing composition a stabilizer which improves the texture and appearance of the icing and may improve its keeping property.

Icings comprising flour, cornstarch or other known bodying agents are not entirely satisfactory, for one reason or another. Furthermore, the known stabilizers, such as alginic acid derivatives, are less effective than is desirable.

One object of this invention is to provide new icing compositions comprising sugar and a thickening and bodying agent which is also a stabilizer for the icing, improves the texture and appearance, and imparts plasticity to the composition so that application thereof to cakes or the like is facilitated.

Another object is to provide a thickening and stabilizing agent for icings which dispenses of the need to incorporate flour, cornstarch or the like in the icing for bodying or suspending purposes, or for any purpose, and which thus eliminates the unpleasant starchy or flour-like taste which is characteristic of icings containing starch or flour.

These and other objects of the invention are accomplished by incorporating with the icing ingredients a small amount of carboxymethyl dextran.

The production of carboxymethyl dextran is described in the pending application of L. J. Novak et al., Serial No. 346,016, filed March 31, 1953. In brief, the selected dextran and a carboxymethylating agent are reacted together in an aqueous alkaline medium whereby the carboxymethyl group is substituted for one or more hydroxyl groups in the dextran molecule. Suitable carboxymethylating agents are chloracetic acid, sodium chloracetate or chloracetamide. The reaction is carried out in an aqueous solution of a strong alkali metal hydroxide such as sodium, potassium or lithium hydroxide. Preferably, the dextran is treated, in aqueous solution or suspension, with an excess of sodium or potassium chloracetate in the presence of an excess of sodium or potassium hydroxide at a temperature of 50° C. to 100° C. for ten minutes to two hours. Also preferably, the molar ratio of sodium chloracetate or potassium chloracetate to dextran is between 2:1 and 12:1, the molar ratio of sodium hydroxide or potassium hydroxide to dextran is between 5:1 and 15:1, and the molar ratio of the water to dextran is between 20:1 and 120:1. The carboxymethyl dextran obtained under these conditions has a D. S. (degree of substitution or average number of carboxymethyl groups per anhydroglucopyranosidic unit) of less than 1:1 to 3:1.

The reaction product is a viscous mass comprising the sodium or potassium salt of the carboxymethyl dextran. The salt may be precipitated from it by a non-solvent therefor, as by means of any water-miscible alcohol, e. g., methyl, ethyl, propyl, isopropyl of t-butyl alcohol, or by means of a water-miscible ketone such as acetone.

The free carboxymethyl dextran may be recovered from the salt by mixing the latter with water, acidifying to pH about 2.0, and precipitating the ether by means of acetone or a water-miscible alcohol as specified above. The pH of 2.0 is not critical and other acid pH values may be used. However, the highest yields of the free ether have been obtained by precipitation at pH 2.0.

The dextran carboxymethylated may be obtained in various ways. Usually, it is biosynthesized from sucrose by a microorganism of the *Leuconostoc mesenteroides* or *L. dextranicum* types, or the enzyme thereof. Microorganisms which may be used include those bearing the following NRRL (Northern Regional Research Laboratory) designations: *Leuconostoc mesenteroides* B–512, B–119, B–1146, B–1190, B–742; B–1191, B–1196, B–1208, B–1216, B–1120, B–1144, B–523; *Streptobacterium dextranicum* B–1254 and *Betabacterium vermiforme* B–1139.

The dextran is produced by introducing a culture of the microorganism, or the enzyme isolated from the culture by filtration, to an aqueous sucrose-bearing nutrient medium and holding the mass until the dextran is synthesized in maximum yield, after which the dextran is precipitated by the addition of a water-miscible aliphatic alcohol or acetone. The precipitated "native" dextran is purified and preferably reduced to fine powder form for carboxymethylation. This "native" dextran as conventionally produced is normally characterized by a very high molecular weight which has been calculated to be in the millions. It may be carboxymethylated at the native molecular weight or it may be partially hydrolyzed to lower molecular weight dextran in any suitable way, as by acid or enzyme action, and then carboxymethylated.

Relatively small amounts of the carboxymethyl dextran are effective in stabilizing the icing compositions. However, the presently preferred ether is one derived from microbiologically produced, unhydrolyzed, native high molecular weight dextran such as native, unhydrolyzed B–512 dextran or dextran equivalent thereto and containing an average of from 2.0 to 3.0 carboxymethyl groups per A. G. U. Such ethers are preferred because of the striking effectiveness thereof, as bodying and stabilizing agents for the icing compositions, in extremely small amounts. Thus, a marked increase is obtained by the addition of these preferred ethers in amounts as low as 0.01% to 0.5% by weight. The carboxymethyl dextrans are much more effective as thickneners than available carboxymethyl celluloses. About five times more of the carboxymethyl celluloses is required to produce a given viscosity increase than is required when the carboxymethyl dextran is used.

The carboxymethyl dextran may be mixed with the other ingredients of the icing composition in the dry, powdered form, as a solution or dispersion in water, or in an edible oil, e. g., in soyabean, sesame or other oil.

The ethers may be used as bodying and stabilizing agents in icings of the various types containing sugar as an essential ingredient, including icings that are whipped for increased volume, icings of the fat type, and simple icings of the meringue type. The following formulations, in which the parts are by weight, are illustrative of some specific icing compositions in accordance with the invention.

I

|  | Percent |
|---|---|
| Water | 22.0 |
| Sugar | 77.8 |
| Carboxymethyl dextran from L. m. B-512 native dextran, average D. S. 2.8 | 0.2 |

The water and sugar are mixed together, and the carboxymethyl dextran is then incorporated with stirring.

II

|  | Percent |
|---|---|
| Sugar | 71.0 |
| Water | 14.0 |
| Shortening | 14.0 |
| Salt | 0.2 |
| Flavoring | 0.4 |
| Carboxymethyl L. m. B-512 dextran average D. S. 2.8 | 0.4 |

This composition is stable, with little coalescence or separation of the fat, and has a uniform, smooth texture and appearance.

III

|  | Percent |
|---|---|
| Sugar | 74.2 |
| Water | 22.7 |
| Egg white liquid | 2.6 |
| Carboxymethyl L. m. B-512 native dextran, average D. S. 2.8 | 0.5 |

The compositions containing the carboxymethyl dextran may be applied to bakery products in any suitable way, as by hand or by machine or, in some instances, when the viscosity permits, by spraying.

The icings, after application, have good "stand-up" quality, that is, they remain relatively stiff and firm and do not tend to become unduly soft on standing.

Various changes and modifications may be made in preparing the icings or toppings of the invention. Since such variations may be made in the details given herein without departing from the spirit and scope of this disclosure, its to be understood that it is not intended to limit the invention except as it is defined in the appended claims.

What is claimed is:

1. An icing composition for bakery products comprising sugar, and as a stabilizing and bodying aid, a small amount of carboxymethyl dextran containing an average of about 2.0 to 3.0 carboxymethyl groups per anhydroglucopyranosidic unit.

2. A icing composition for bakery products comprising sugar, and as a stabilizing and bodying aid, from about 0.01% to 0.5% by weight of a carboxymethyl ether of a microbiologically produced native, unhydrolyzed dextran containing an average of from 2.0 to 3.0 carboxymethyl groups per anhydroglucopyranosidic unit of the dextran.

3. An icing composition for bakery products comprising a mixture of sugar, water and, as a stabilizing and bodying aid, a small amount of carboxymethyl dextran containing an average of about 2.0 to 3.0 carboxymethyl groups per anhydroglucopyranosidic unit.

4. An icing composition for bakery products comprising a mixture of sugar, water and, as a stabilizing and bodying aid, from 0.01% to 0.5% by weight of a carboxymethyl ether of a microbiologically produced native unhydrolyzed dextran containing an average of 2.0 to 3.0 carboxymethyl groups per anhydroglucopyranosidic unit of the dextran.

5. An icing composition for bakery products comprising sugar, water, shortening, salt, flavoring and, as stabilizing and bodying agent, a small amount of carboxymethyl dextran containing an average of about 2.0 to 3.0 carboxymethyl groups per anhydroglucopyranosidic unit.

6. An icing composition for bakery products comprising sugar, water, shortening, salt, flavoring and, as a stabilizing and bodying agent, from 0.01% to 0.5% by weight of a carboxymethyl ether of a microbiologically produced, native unhydrolyzed dextran containing from 2.0 to 3.0 carboxymethyl groups per anhydroglucopyranosidic unit of the dextran.

7. An icing composition for use on bakery products comprising sugar, egg white liquid and, as stabilizing and bodying aid, a small amount of carboxymethyl dextran containing an average of about 2.0 to 3.0 carboxymethyl groups per anhydroglucopyranosidic unit.

8. An icing composition for use on bakery products comprising sugar, egg white liquid and, as stabilizing and bodying aid, from 0.01% to 0.5% by weight of a carboxymethyl ether of microbiologically produced, native unhydrolyzed dextran containing an average of from 2.0 to 3.0 carboxymethyl groups per anhydroglucopyranosidic unit of the dextran.

9. An icing composition for use on bakery products comprising sugar, flavoring and, as stabilizing and bodying aid, a small amount of carboxymethyl dextran containing an average of about 2.0 to 3.0 carboxymethyl groups per anhydroglucopyranosidic unit.

10. An icing composition for use on bakery products comprising sugar, flavoring and, as stabilizing and bodying aid, from 0.01% to 0.5% by weight of a carboxymethyl ether of a microbiologically produced, native unhydrolyzed dextran containing an average of 2.0 to 3.0 carboxymethyl groups per anhydroglucopyranosidic unit of the dextran.

11. The method of stabilizing and bodying an icing composition for bakery products comprising sugar which comprises mixing with the icing ingredients a small amount of a carboxymethyl dextran containing an average of about 2.0 to 3.0 carboxymethyl groups, per anhydroglucopyranosidic unit.

12. The method of stabilizing and bodying an icing composition for bakery product comprising sugar and water which comprises mixing with the icing ingredients a small amount of carboxymethyl dextran containing an average of about 2.0 to 3.0 carboxymethyl groups per anhydroglucopyranosidic unit.

13. The method of stabilizing and bodying an icing composition for bakery products comprising sugar, water, shortening, salt, and flavoring, which comprises mixing with the icing ingredients a small amount of carboxymethyl dextran containing an average of about 2.0 to 3.0 carboxymethyl groups per anhydroglucopyranosidic unit.

14. The method of stabilizing and bodying an icing composition for bakery products comprising sugar and egg white liquid which comprises mixing with the icing ingredients a small amount of a carboxymethyl dextran containing an average of about 2.0 to 3.0 carboxymethyl groups per anhydroglucopyranosidic unit.

References Cited in the file of this patent

UNITED STATES PATENTS

| 2,089,217 | Mahoney | Aug. 10, 1937 |
| 2,409,816 | Wadsworth et al. | Oct. 22, 1946 |
| 2,602,082 | Owen | July 1, 1952 |
| 2,609,368 | Gaver | Sept. 2, 1952 |